(12) United States Patent
Lille

(10) Patent No.: US 8,270,257 B2
(45) Date of Patent: Sep. 18, 2012

(54) THERMALLY ASSISTED RECORDING SYSTEMS WITH LOW LOSS LIGHT REDIRECTION STRUCTURE

(75) Inventor: Jeffrey S. Lille, Sunnyvale, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 448 days.

(21) Appl. No.: 12/024,011

(22) Filed: Jan. 31, 2008

(65) Prior Publication Data

US 2009/0196128 A1 Aug. 6, 2009

(51) Int. Cl.
*G11B 11/00* (2006.01)
(52) U.S. Cl. .................................. 369/13.13; 369/13.33
(58) Field of Classification Search .............. 369/13.32, 369/13.33, 13.13, 13.02, 112.09, 112.14, 369/112.21, 112.27, 14, 15; 360/59; 385/129, 385/31, 88–94; 250/201.3, 201.5
See application file for complete search history.

(56) References Cited

U.S. PATENT DOCUMENTS

| | | | | |
|---|---|---|---|---|
| 5,065,390 | A | * | 11/1991 | Miyauchi et al. ........ 369/112.22 |
| 5,835,458 | A | | 11/1998 | Bischel et al. ............. 369/44.12 |
| 5,852,693 | A | * | 12/1998 | Jeong ............................. 385/47 |
| 6,075,673 | A | * | 6/2000 | Wilde et al. .................... 369/300 |
| 6,690,526 | B2 | | 2/2004 | Ito et al. ........................... 360/59 |
| 7,164,824 | B2 | * | 1/2007 | Rasras et al. ..................... 385/50 |
| 2002/0015297 | A1 | * | 2/2002 | Hayashi et al. .................. 362/27 |
| 2003/0043699 | A1 | * | 3/2003 | Isshiki et al. ............... 369/13.33 |
| 2005/0152633 | A1 | * | 7/2005 | Li et al. ............................ 385/14 |
| 2006/0143635 | A1 | * | 6/2006 | Liu et al. ......................... 720/659 |
| 2006/0182399 | A1 | | 8/2006 | Lin et al. ........................ 385/129 |
| 2007/0159720 | A1 | | 7/2007 | Sohn et al. ..................... 360/128 |
| 2007/0165494 | A1 | | 7/2007 | Cho et al. ................... 369/13.32 |
| 2007/0165495 | A1 | | 7/2007 | Lee et al. .................... 369/13.33 |
| 2007/0188922 | A1 | | 8/2007 | Tawa et al. ..................... 360/128 |
| 2007/0230288 | A1 | * | 10/2007 | Nishida et al. ............. 369/13.13 |

FOREIGN PATENT DOCUMENTS

| | | |
|---|---|---|
| JP | 2195531 | 8/1990 |
| JP | 2251908 | 10/1990 |
| JP | 2007026593 | 2/2007 |

OTHER PUBLICATIONS

Mihalcea et al., "Fabrication of dielectric optical waveguides on A1TiC sliders for Heat Assisted Magnetic Recording" Optical Data Storage 2004, Proceedings of SPIE vol. 5380.

* cited by examiner

*Primary Examiner* — Tan X Dinh
(74) *Attorney, Agent, or Firm* — Zilka-Kotab, PC

(57) ABSTRACT

A system according to one embodiment comprises a slider having a first light channel and a second light channel, the first and second light channels having axes oriented at an angle relative to each other, the angle being less than 180 degrees; and a reflection portion adjacent an exit of the first light channel and an entrance to the second light channel, the reflection portion having an index of refraction that is different than an index of refraction of the first light channel, such that light from the first light channel is reflected into the second light channel. Additional systems and methods are provided.

25 Claims, 6 Drawing Sheets

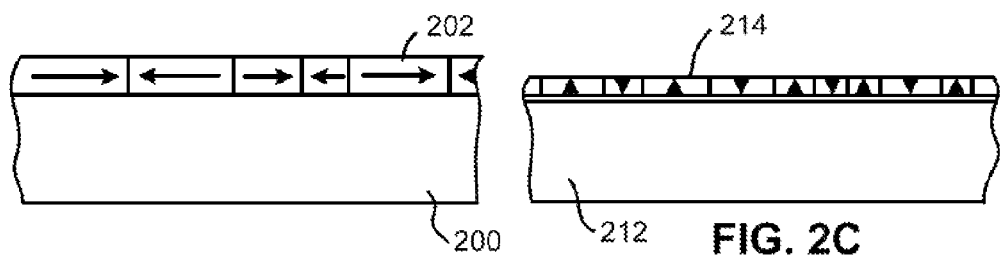
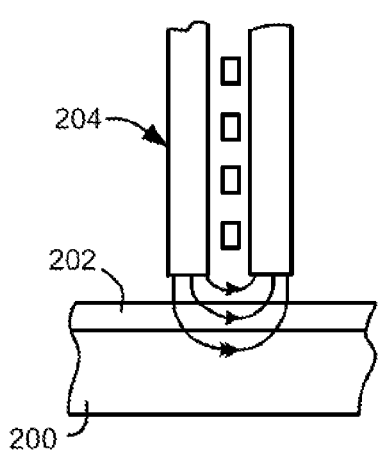
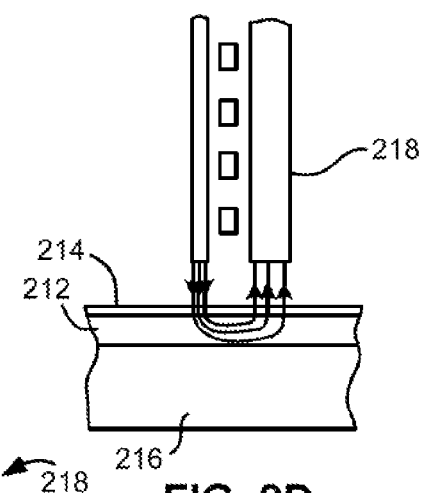
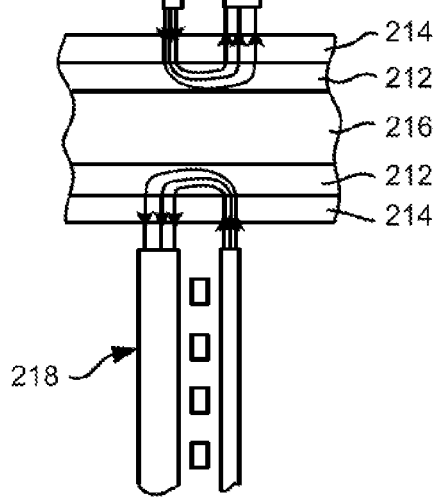

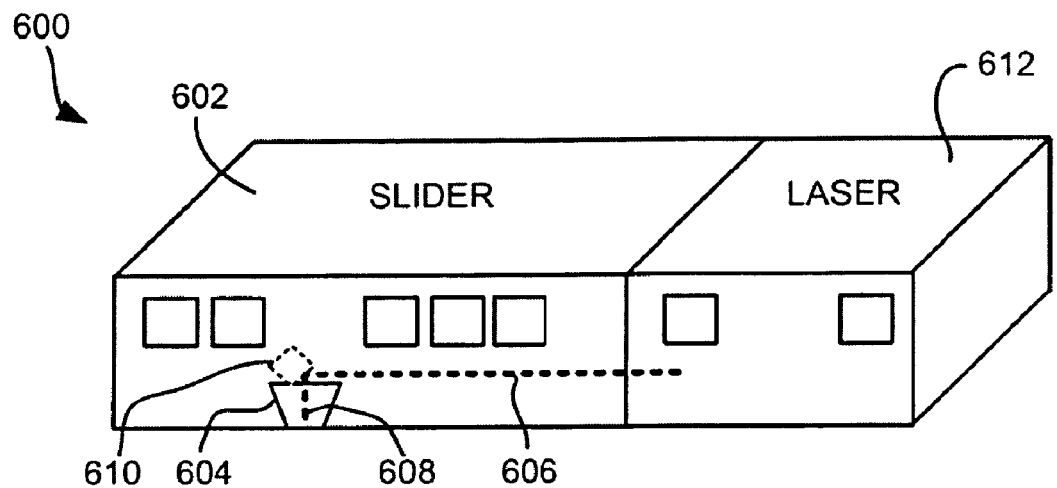
FIG. 6
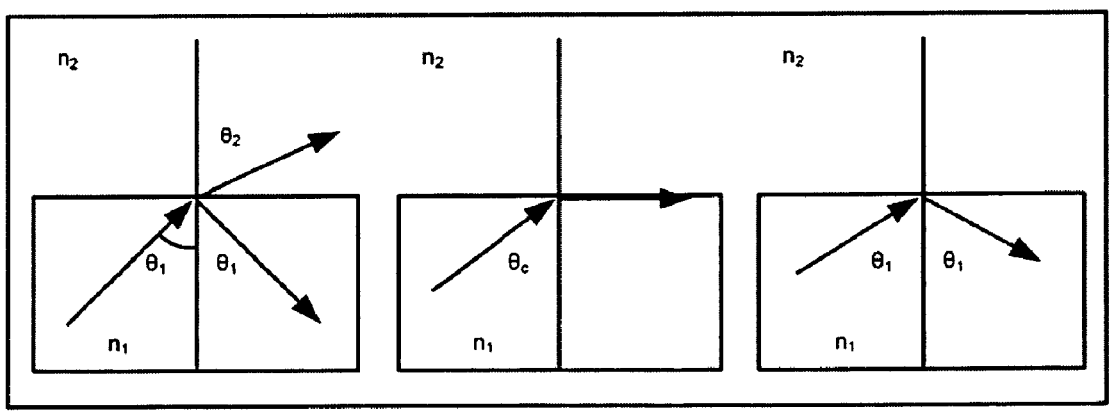
FIG. 7A  FIG. 7B  FIG. 7C

THERMALLY ASSISTED RECORDING SYSTEMS WITH LOW LOSS LIGHT REDIRECTION STRUCTURE

FIELD OF THE INVENTION

The present invention relates to data storage systems, and more particularly, this invention relates to thermally assisted recording systems.

BACKGROUND OF THE INVENTION

The heart of a computer is a magnetic disk drive which typically includes a rotating magnetic disk, a slider that has read and write heads, a suspension arm above the rotating disk and an actuator arm that swings the suspension arm to place the read and/or write heads over selected circular tracks on the rotating disk. The suspension arm biases the slider into contact with the surface of the disk when the disk is not rotating but, when the disk rotates, air is swirled by the rotating disk adjacent an air bearing surface (ABS) of the slider causing the slider to ride on an air bearing a slight distance from the surface of the rotating disk. When the slider rides on the air bearing the write and read heads are employed for writing magnetic impressions to and reading magnetic signal fields from the rotating disk. The read and write heads are connected to processing circuitry that operates according to a computer program to implement the writing and reading functions.

Thermally assisted recording is an emerging field in data recording. Accordingly, challenges have arisen during development of this technology. The following description provides solutions to some of those challenges.

SUMMARY OF THE INVENTION

A system according to one embodiment comprises a slider having a first light channel and a second light channel, the first and second light channels having axes oriented at an angle relative to each other, the angle being less than 180 degrees; and a reflection portion adjacent an exit of the first light channel and an entrance to the second light channel, the reflection portion having an index of refraction that is different than an index of refraction of the first light channel, such that light from the first light channel is reflected into the second light channel.

A system according to another embodiment comprises a magnetic head having a first light channel and a second light channel passing therethrough, the first and second light channels having axes oriented at an angle relative to each other, the angle being less than 180 degrees; and a reflection portion adjacent an exit of the first light channel and an entrance to the second light channel, the reflection portion having an index of refraction that is different than an index of refraction of the first light channel, such that light from the first light channel is reflected into the second light channel.

A magnetic recording system according to yet another embodiment comprises a slider or magnetic head having a first light channel and a second light channel passing therethrough, the first and second light channels having axes oriented at an angle relative to each other, the angle being less than 180 degrees; and a void in the slider or magnetic head, the void being adjacent an exit of the first light channel and an entrance to the second light channel, an index of refraction of the first light channel being different than air in the void such that light from the first light channel is reflected into the second light channel.

A method according to a further embodiment comprises forming a slider or magnetic head having a first light channel and a second light channel, the first and second light channels having axes oriented at an angle relative to each other, the angle being less than 180 degrees; and forming a hole in the slider or magnetic head, the hole being adjacent an exit of the first light channel and an entrance to the second light channel, an index of refraction of the first light channel being different than air in the hole such that light from the first light channel is reflected into the second light channel.

Other aspects and advantages of the present invention will become apparent from the following detailed description, which, when taken in conjunction with the drawings, illustrate by way of example the principles of the invention.

BRIEF DESCRIPTION OF THE DRAWINGS

For a fuller understanding of the nature and advantages of the present invention, as well as the preferred mode of use, reference should be made to the following detailed description read in conjunction with the accompanying drawings.

FIG. 2A is a schematic representation in section of a recording medium utilizing a longitudinal recording format.

FIG. 2B is a schematic representation of a conventional magnetic recording head and recording medium combination for longitudinal recording as in FIG. 2A.

FIG. 2C is a magnetic recording medium utilizing a perpendicular recording format.

FIG. 2D is a schematic representation of a recording head and recording medium combination for perpendicular recording on one side.

FIG. 2E is a schematic representation of the recording apparatus of the present invention, similar to that of FIG. 2D, but adapted for recording separately on both sides of the medium.

FIG. 6 is a diagram of a system according to one embodiment.

FIGS. 7A-C graphically illustrate application of Snells's law.

DETAILED DESCRIPTION

Figure 1:
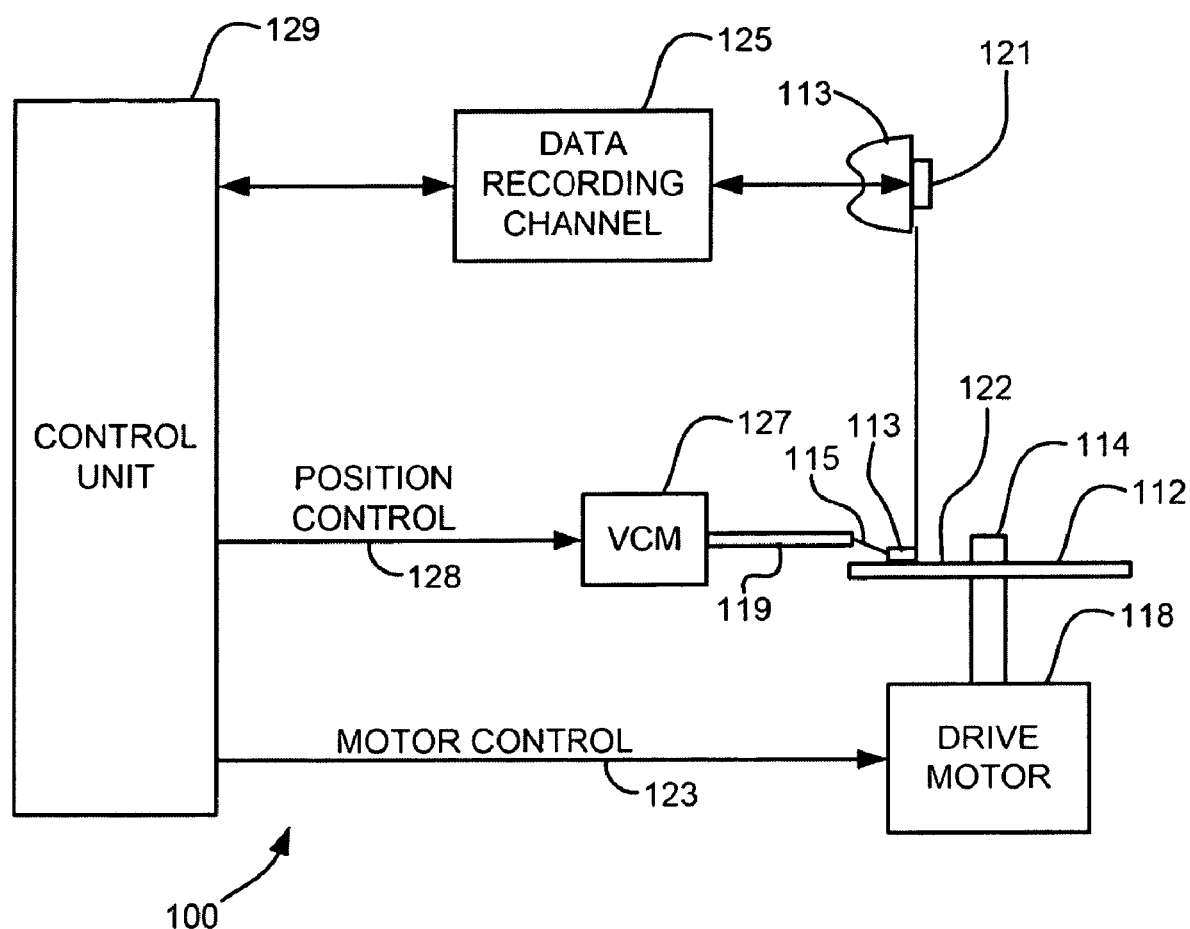
FIG. 1 is a simplified drawing of a magnetic recording disk drive system.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

The following description discloses several preferred embodiments of magnetic storage systems, as well as operation and/or component parts thereof and/or testing/reliability systems and methods for magnetic storage systems.

In one general embodiment, a system includes a slider having a first light channel and a second light channel, the first and second light channels having axes oriented at an angle relative to each other, the angle being less than 180 degrees; and a reflection portion adjacent an exit of the first light channel and an entrance to the second light channel, the reflection portion having an index of refraction that is different than an index of refraction of the first light channel, such that light from the first light channel is reflected into the second light channel.

In another general embodiment, a method includes a magnetic head having a first light channel and a second light channel passing therethrough, the first and second light channels having axes oriented at an angle relative to each other, the angle being less than 180 degrees; and a reflection portion adjacent an exit of the first light channel and an entrance to the second light channel, the reflection portion having an index of refraction that is different than an index of refraction of the first light channel, such that light from the first light channel is reflected into the second light channel.

In yet another general embodiment, a magnetic recording system includes a slider or magnetic head having a first light channel and a second light channel passing therethrough, the first and second light channels having axes oriented at an angle relative to each other, the angle being less than 180 degrees; and a void in the slider or magnetic head, the void being adjacent an exit of the first light channel and an entrance to the second light channel, an index of refraction of the first light channel being different than air in the void such that light from the first light channel is reflected into the second light channel.

In another general embodiment, a method includes forming a slider or magnetic head having a first light channel and a second light channel, the first and second light channels having axes oriented at an angle relative to each other, the angle being less than 180 degrees; and forming a hole in the slider or magnetic head, the hole being adjacent an exit of the first light channel and an entrance to the second light channel, an index of refraction of the first light channel being different than air in the hole such that light from the first light channel is reflected into the second light channel.

Referring now to FIG. 1, there is shown a disk drive 100 in accordance with one embodiment of the present invention. As shown in FIG. 1, at least one rotatable magnetic disk 112 is supported on a spindle 114 and rotated by a disk drive motor 118. The magnetic recording on each disk is in the form of an annular pattern of concentric data tracks (not shown) on the disk 112.

At least one slider 113 is positioned near the disk 112, each slider 113 supporting one or more magnetic read/write heads 121. As the disks rotate, slider 113 is moved radially in and out over disk surface 122 so that heads 121 may access different tracks of the disk where desired data are recorded. Each slider 113 is attached to an actuator arm 119 by means of a suspension 115. The suspension 115 provides a slight spring force which biases slider 113 against the disk surface 122. Each actuator arm 119 is attached to an actuator means 127. The actuator means 127 as shown in FIG. 1 may be a voice coil motor (VCM). The VCM comprises a coil movable within a fixed magnetic field, the direction and speed of the coil movements being controlled by the motor current signals supplied by controller 129.

During operation of the disk storage system, the rotation of disk 112 generates an air bearing between slider 113 and disk surface 122 which exerts an upward force or lift on the slider. The air bearing thus counter-balances the slight spring force of suspension 115 and supports slider 113 off and slightly above the disk surface by a small, substantially constant spacing during normal operation.

The various components of the disk storage system are controlled in operation by control signals generated by control unit 129, such as access control signals and internal clock signals. Typically, control unit 129 comprises logic control circuits, storage means and a microprocessor. The control unit 129 generates control signals to control various system operations such as drive motor control signals on line 123 and head position and seek control signals on line 128. The control signals on line 128 provide the desired current profiles to optimally move and position slider 113 to the desired data track on disk 112. Read and write signals are communicated to and from read/write heads 121 by way of recording channel 125.

The above description of a typical magnetic disk storage system, and the accompanying illustration of FIG. 1 are for representation purposes only. It should be apparent that disk storage systems may contain a large number of disks and actuators, and each actuator may support a number of sliders.

An interface may also be provided for communication between the disk drive and a host (integral or external) to send and receive the data and for controlling the operation of the disk drive and communicating the status of the disk drive to the host, all as will be understood by those of skill in the art.

In a typical head, an inductive write head includes a coil layer embedded in one or more insulation layers (insulation stack), the insulation stack being located between first and second pole piece layers. A gap is formed between the first and second pole piece layers by a gap layer at an air bearing surface (ABS) of the write head. The pole piece layers may be connected at a back gap. Currents are conducted through the coil layer, which produce magnetic fields in the pole pieces. The magnetic fields fringe across the gap at the ABS for the purpose of writing bits of magnetic field information in tracks on moving media, such as in circular tracks on a rotating magnetic disk.

The second pole piece layer has a pole tip portion which extends from the ABS to a flare point and a yoke portion which extends from the flare point to the back gap. The flare point is where the second pole piece begins to widen (flare) to form the yoke. The placement of the flare point directly affects the magnitude of the magnetic field produced to write information on the recording medium. Since magnetic flux decays as it travels down the length of the narrow second pole tip, shortening the second pole tip will increase the flux reaching the recording media. Therefore, performance can be optimized by aggressively placing the flare point close to the ABS.

FIG. 2A illustrates, schematically, a conventional recording medium such as used with conventional magnetic disc recording systems, such as that shown in FIG. 3A. This medium is utilized for recording magnetic impulses in or parallel to the plane of the medium itself. The recording medium, a recording disc in this instance, comprises basically a supporting substrate 200 of a suitable non-magnetic material such as glass, with an overlying coating 202 of a suitable and conventional magnetic layer.

FIG. 2B shows the operative relationship between a conventional recording/playback head 204, which may preferably be a thin film head, and a conventional recording medium, such as that of FIG. 2A.

FIG. 2C illustrates schematically the orientation of magnetic impulses substantially perpendicular to the surface of the recording medium. For such perpendicular recording the medium includes an under layer 212 of a material having a high magnetic permeability. This under layer 212 is then provided with an overlying coating 214 of magnetic material preferably having a high coercivity relative to the under layer 212.

Two embodiments of storage systems with perpendicular heads 218 are illustrated in FIGS. 2C and 2D (not drawn to scale). The recording medium illustrated in FIG. 2D includes both the high permeability under layer 212 and the overlying coating 214 of magnetic material described with respect to FIG. 2C above. However, both of these layers 212 and 214 are shown applied to a suitable substrate 216. Typically there is also an additional layer (not shown) called an "exchange-break" layer or "interlayer" between layers 212 and 214.

By this structure the magnetic lines of flux extending between the poles of the recording head loop into and out of the outer surface of the recording medium coating with the high permeability under layer of the recording medium causing the lines of flux to pass through the coating in a direction generally perpendicular to the surface of the medium to record information in the magnetically hard coating of the medium in the form of magnetic impulses having their axes of magnetization substantially perpendicular to the surface of the medium. The flux is channeled by the soft underlying coating 212 back to the return layer (P1) of the head 218.

FIG. 2E illustrates a similar structure in which the substrate 216 carries the layers 212 and 214 on each of its two opposed sides, with suitable recording heads 218 positioned adjacent the outer surface of the magnetic coating 214 on each side of the medium.

Figure 3:
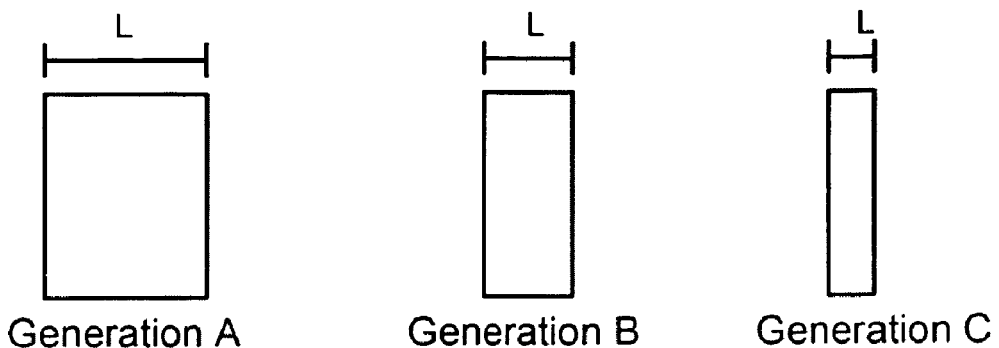
FIG. 3 is a graphical depiction of bit lengths.

A continuing goal of magnetic recording is to maximize the number of bits stored per unit area of a magnetic medium. One way to do this is to increase the number of bits per track on the medium, such as by reducing the bit length along the data track. Referring to FIG. 3, there is shown a progression of bit length (L) reduction on the magnetic medium, referred to generically as Generation A, Generation B, and Generation C. However, reducing the bit length can lead to a loss of data from the disk due to such things as thermal fluctuations. Particularly, as the bit size is reduced, the energy that is required to flip the bit's magnetic polarity is reduced as a function of volume over temperature, as noted in Equation 1:

$$E \sim AV/kT \qquad \text{Equation 1}$$

where E is the Energy or heat required to flip the bit's polarity, V is the volume of magnetic medium that the bit occupies, A is the anisotropy of the magnetic bit, k is the Boltzmann constant and T is the temperature. As the volume is reduced, the energy required to flip the bit is reduced and thermal fluctuations can lead to data loss. Since a reduction in volume of the bit is desired, but data loss is not acceptable, the anisotropy of the bit material must be higher at working temperatures to prevent the bit from flipping due to, e.g., thermal fluctuations, which could result in data loss. Therefore, selection of magnetic media with a higher anisotropy is desirable.

Figure 4:
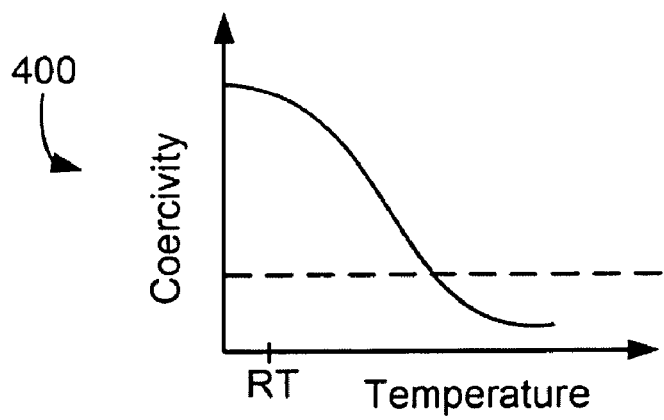
FIG. 4 is a graph of Coercivity versus Temperature of a material in a recording layer of a magnetic medium.

Writing to magnetic media having very high coercivity becomes difficult, as increased antisotropy or coercivity of a magnetic medium makes the disk more resistive to writing (changing the orientation of the bits). To overcome this increased resistivity to writing, the magnetic medium may be heated to reduce the amount of magnetic flux required to reorient the magnetic bits. FIG. 4 discloses a graph 400 (representative only) of Coercivity (measured in Oersted) versus Temperature (measured in Kelvin). As shown, at room temperature (RT), the coercivity of the magnetic medium is above a practically writeable coercivity level, shown as dashed line 405 under which writing to the disk is feasible, preferably with conventional writing techniques, and above which the magnetic medium is stable and thermal fluctuations will not readily cause the bits to flip. The magnetic medium may be heated to reduce the coercivity below the threshold 405, allowing writing to the magnetic medium. Therefore, by heating the magnetic medium, the magnetic medium will enter a state at which bits can be more easily oriented, thereby resulting in data being stored on the magnetic medium.

Figure 5:
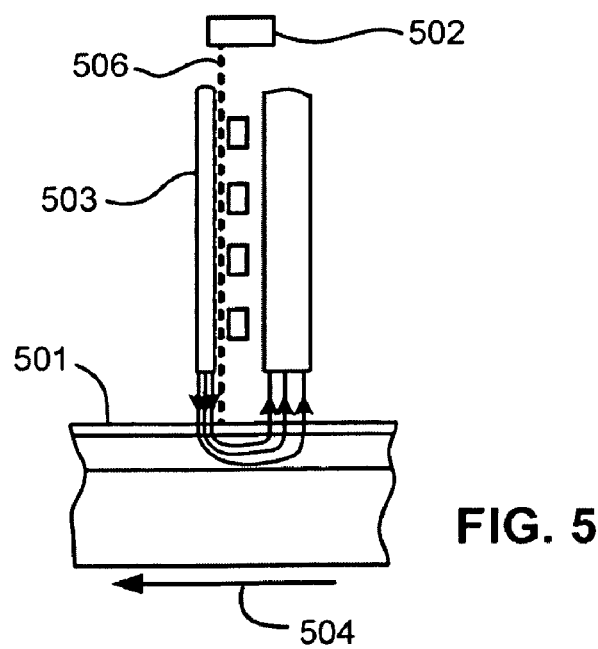
FIG. 5 is a system diagram of a system for localized heating of the magnetic medium for thermally assisted writing.

FIG. 5 illustrates a system for localized heating of the magnetic medium 501 for thermally assisted writing. The magnetic medium 501 moves in the direction of the arrow 504. A heating device 502 heats the magnetic medium just prior to the heated portion arriving at the writing pole 503 of the head, e.g., using a laser beam 506. This results in the magnetic medium having a reduced anisotropy due to the increased temperature of the medium adjacent the writing pole 503 of the head. After the heated portion of the magnetic medium 501 has moved past the writing pole 503 of the head, the temperature of the magnetic medium 501 decreases rapidly so that the anisotropy thereof returns to a higher, more stable level.

Illustrative heating devices may use a beam of light, a beam of electrons, radiation, etc. For instance, a laser may be used. In another approach, an electron emitter may employ an electron cone to focus electrons emitted therefrom onto the medium.

When using thermally assisted recording, it is desirable to maximize the amount of power presented to the medium, as this requires less power to the heating device, which in turn reduces overall system power consumption, as well as may extend the life of the heating device. One way to maximize the amount of power transferred from a laser source to the magnetic medium is to minimize any losses in the light path that the light beam travels through from the source to the medium. Accordingly, one general approach is to take advantage of a near total reflection that may be achieved by interfacing two materials having different indexes of refraction.

FIG. 6 illustrates a system 600 including a slider 602, a head 604 formed on or mounted to the slider 602, a first light channel 606 and a second light channel 608. The light channels 606, 608 are indicated by dashed lines in this embodiment to reflect an embodiment where the light channels pass through the slider 602 and/or head 604. Accordingly, such light channels may include voids; waveguides such as optical material formed in channels, commercially available or specialty fiber optic cables; etc. In other approaches, portions of the light channels 606, 608 may be positioned exteriorly of the slider 602 and/or head 604. In further embodiments, one or more of the light channels 606, 608 may be entirely outside the slider 602 and/or head 604. Further, the light channels 606, 608 may be formed of a common material, or of different materials.

As shown in FIG. 6, the first and second light channels 606, 608 have axes oriented at an angle relative to each other, the angle being less than 180 degrees. More details about illustrative angles will be provided below.

A reflection portion 610 is located adjacent an exit of the first light channel 606 and an entrance to the second light channel 608. The reflection portion has an index of refraction that is different than an index of refraction of the first light channel 606, such that light from the first light channel 606 is reflected into the second light channel 608.

By taking advantage of this reflective phenomenon at the interface between the differing materials, very low loss nonlinear light paths can be created, particularly where a total internal reflection is achieved. The reflective behavior of light at such an interface can be expressed by Snell's law, as shown in Equation 2, below.

$$n_1 \sin \Theta_1 = n_2 \sin \Theta_2 \qquad \text{Equation 2}$$

where
$n_1$ is the index of refraction of the first material,
$n_2$ is the index of refraction of the second material,
$\Theta_1$ is the angle of approaching light, and
$\Theta_2$ is the angle of the reflected light.

The indices of refraction of the media, labeled $n_1$, $n_2$ and so on, are used to represent the factor by which light is "slowed down" within a refractive medium, such as glass or water, compared to its velocity in a vacuum. As light passes the border between media, depending upon the relative refractive indices of the two media, the light will either be refracted to a lesser angle, or a greater one. These angles are measured with respect to a normal line, represented perpendicular to the boundary. In the case of light traveling from air into water, light would be refracted towards the normal line, because the light is slowed down in water; light traveling from water to air would refract away from the normal line.

FIGS. 7A-C graphically illustrate application of Snells's law. As shown in FIG. 7A, if angle $\Theta_1$ is below a critical angle $\Theta_c$, a portion of the light passes into the second material and some is reflected. That light passing into the second material may be considered a loss. The critical angle $\Theta_c$ is defined by Equation 3.

$$\Theta_c = \sin^{-1}(n_1/n_2) \qquad \text{Equation 3}$$

Referring to FIG. 7B, if the angle $\Theta_1$ is increased to the critical angle $\Theta_c$, the light travels along the interface between the two materials. If the angle $\Theta_1$ is increased above the critical angle $\Theta_c$, almost all of the light is reflected away from the interface, as shown in FIG. 7C. This is referred to as an internal reflection.

In a particularly preferred embodiment, a total internal reflection occurs. Total internal reflection is an optical phenomenon that occurs when a ray of light strikes a medium boundary at an angle larger than the critical angle with respect to the normal to the surface. If the refractive index is lower on the other side of the boundary no light can pass through, so effectively all of the light is reflected. This can only occur where light travels from a medium with a higher refractive index to one with a lower refractive index. For example, it will occur when passing from glass to air, but not when passing from air to glass.

Accordingly, at least about 80% of the light from the first light channel is reflected into the second light channel, and more preferably at least about 90%, and even about 100% reflection may be achieved.

Referring again to FIG. 6, the reflection portion 610 may include air, glass, a carbonaceous material, a polymer, etc. The particular materials selected for the reflection portion 610 and channels 606, 608 may be readily determined by application of Equations 2 and 3.

In one example, assume the reflection portion 610 includes air having an index of refraction of about 1. The first and second channels 606, 608 comprise a fiber optic cable having an index of refraction of 1.8. Applying these numbers to Equation 3, $\Theta_c = 33.75$ degrees. Accordingly, the angle of incoming light relative to a line perpendicular to the interface should be greater than 33.75 degrees.

In another example, assume the reflection portion 610 includes air having an index of refraction of about 1. The first and second channels 606, 608 comprise a fiber optic cable having an index of refraction of 2.2. Applying these numbers to Equation 3, $\Theta_c = 27.04$ degrees. Accordingly, the angle $\Theta_1$ of incoming light relative to a line perpendicular to the interface should be greater than 27.04 degrees.

With continued reference to FIG. 6, the embodiment shown has a laser 612 coupled to a side of the slider 602, the laser 612 being for emitting a beam of light for heating a magnetic medium that, though not shown, would typically be adjacent the ABS. Other embodiments may have a laser 612 coupled to a top of the slider 602, where the top is positioned on an opposite side of the slider as the ABS. However, in other embodiments, the laser can be in the slider, on the slider, somewhere else in the drive remote from the slider, etc.

Figure 8:
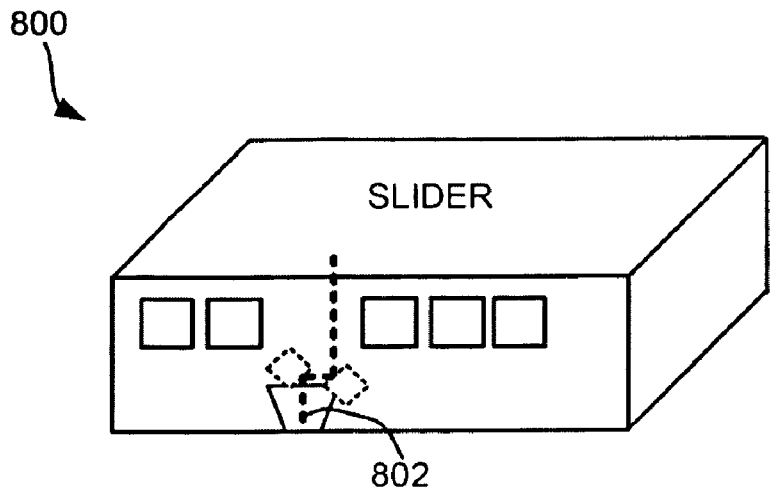
FIG. 8 is a diagram of a system according to one embodiment.

It should be kept in mind that the light path may have multiple turns. Referring to FIG. 8, there is shown an embodiment 800 in which the light path 802 has multiple turns.

The various embodiments of the systems may be formed by conventional methods, as will be apparent to those skilled in the art. By way of example only, and with reference to FIG. 9, one method 900 for creating a system having a nonlinear optical path includes, in operation 902, forming a slider or magnetic head having a first light channel and a second light channel, the first and second light channels having axes oriented at an angle relative to each other, the angle being less than 180 degrees. In operation 904, a hole is formed in the slider or magnetic head, the hole being adjacent an exit of the first light channel and an entrance to the second light channel, an index of refraction of the first light channel being different than air in the hole such that light from the first light channel is reflected into the second light channel.

Figure 9:
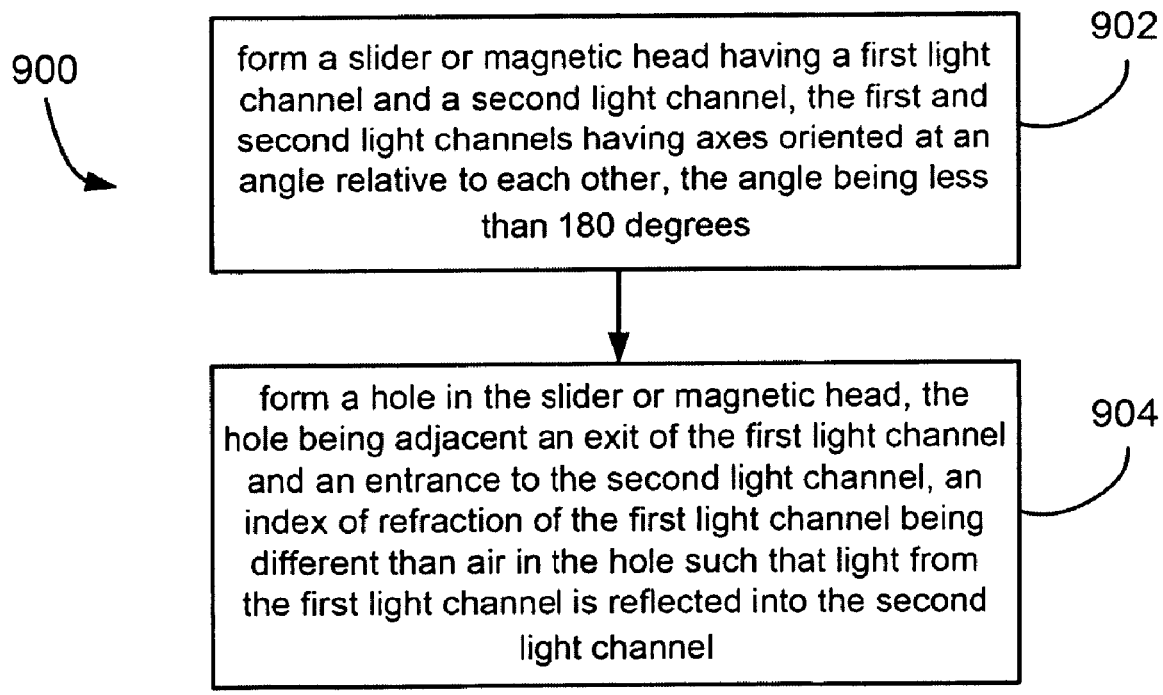
FIG. 9 is a flow diagram of a process according to one embodiment.
Figure 10C:
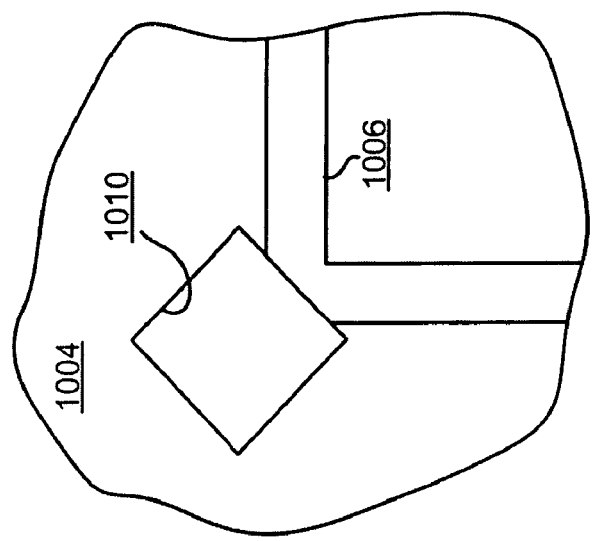
FIGS. 10A-C are process diagrams depicting a method according to one embodiment.
Figure 10B:
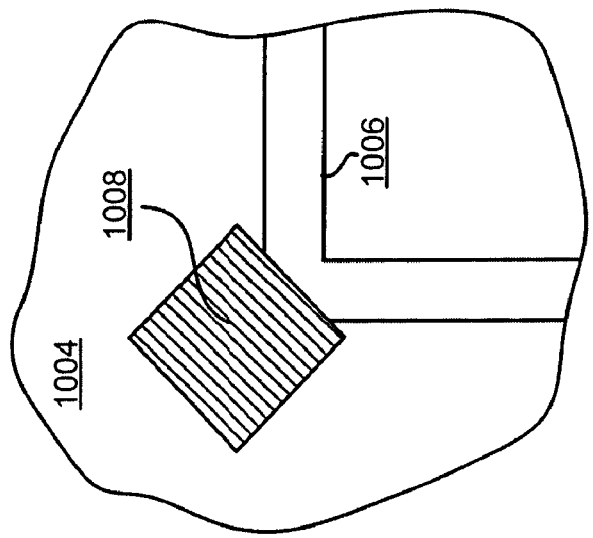
Figure 10A:
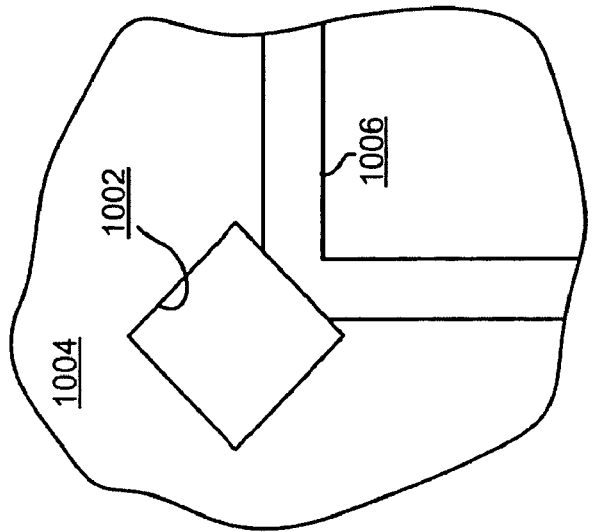

FIGS. 10A-C illustrate one method for performing operation 904 of FIG. 9. Referring to FIG. 10A, a hole 1002 is etched in the slider 1004 adjacent a waveguide 1006. Referring to FIG. 10B, the hole is filled with a sacrificial material 1008. Illustrative sacrificial materials include Cu, NiFe, etc. Additional processing on the slider may be performed. Then, as shown in FIG. 10C, the sacrificial material is removed, e.g., by wet etching, leaving the hole 1010. The dimensions of the hole 1010 may differ from the starting dimensions of hole 1002. Air may fill the hole 1010, or another material may be added such as a material having a different index of refraction than the waveguide 1006. Assuming air fills the hole 1010, the light comes in along the waveguide and impinges on the air in the hole. The light is reflected at an angle of incidence.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A system, comprising:
    a slider having a first light channel and a second light channel, the first and second light channels having axes oriented at an angle relative to each other, the angle being less than 180 degrees;
    a thin film write head formed directly on the slider; and
    a hole embedded in the slider, an outer periphery of the hole defining a reflection portion that forms an interface with the first light channel and an entrance to the second light channel, the reflection portion having an index of refraction that is different than an index of refraction of the first light channel, such that light from the first light channel is reflected into the second light channel.

2. A system as recited in claim 1, wherein the first light channel includes a fiber optic cable, wherein the reflection portion extends along a plane oriented perpendicular to a plane of deposition of the write head.

3. A system as recited in claim 1, wherein the reflection portion includes air.

4. A system as recited in claim 1, further comprising a light source for emitting the light, the light source being located remotely from the slider.

5. A system as recited in claim 1, further comprising a light source for emitting the light that travels through the first and second light channels, the light source being mounted on the slider.

6. A system as recited in claim 5, wherein the light source is a laser.

7. A system as recited in claim 5, wherein the light source is mounted on a side of the slider, the side being oriented about perpendicular to an air bearing surface of the slider.

8. A system as recited in claim 5, wherein the light source is coupled to a top of the slider, the top being positioned on an opposite side of the slider as an air bearing surface of the slider, light from the light source travelling through a plane of the top surface.

9. A system as recited in claim 1, wherein the thin film write head includes a writing pole and a return layer, wherein the second light channel is positioned between the writing pole and the return layer, the second light channel being positioned along a straight line extending through the writing pole and return layer.

10. A system as recited in claim 1, wherein one of the light channels is coupled to an exterior of the slider.

11. A system as recited in claim 1, wherein at least about 80% of the light from the first light channel is reflected into the second light channel.

12. A system, comprising:
a thin film magnetic head formed directly on a slider, the magnetic head having a first light channel and a second light channel passing therethrough, the first and second light channels having axes oriented at an angle relative to each other, the angle being less than 180 degrees; and
a reflection portion adjacent an exit of the first light channel and an entrance to the second light channel, the reflection portion having an index of refraction that is different than an index of refraction of the first light channel, such that light from the first light channel is reflected into the second light channel.

13. A system as recited in claim 12, wherein the first light channel also passes through the slider, wherein the reflection portion extends along a plane oriented perpendicular to a plane of deposition of the write head.

14. A system as recited in claim 12, wherein the reflection portion includes air, the reflection portion being present in the magnetic head.

15. A system as recited in claim 12, further comprising a light source for emitting the light, the light source being located remotely from the head.

16. A system as recited in claim 12, further comprising a light source for emitting the light that travels through the first and second light channels, the light source being coupled to the slider.

17. A system as recited in claim 16, wherein the light source is a laser.

18. A system as recited in claim 16, wherein the light source is coupled to a side of the slider, the side being oriented about perpendicular to an air bearing surface of the slider.

19. A system as recited in claim 16, wherein the light source is mounted on a top of the slider, the top being positioned on an opposite side of the slider as an air bearing surface of the slider.

20. A system as recited in claim 12, wherein both of the light channels pass through the thin film write head, wherein the thin film write head includes a writing pole and a return layer, wherein the second light channel is positioned between the writing pole and the return layer, the second light channel being positioned along a straight line extending through the writing pole and return layer.

21. A system as recited in claim 12, wherein one of the light channels includes a portion mounted on an exterior of the head.

22. A system as recited in claim 12, wherein at least about 80% of the light from the first light channel is reflected into the second light channel.

23. A magnetic recording system, comprising:
a slider or magnetic head having a first light channel and a second light channel passing therethrough, the first and second light channels having axes oriented at an angle relative to each other, the angle being less than 180 degrees; and
a void in the slider or magnetic head, the void being adjacent an exit of the first light channel and an entrance to the second light channel, an index of refraction of the first light channel being different than air or a material in the void such that light from the first light channel is reflected into the second light channel,
wherein the reflection portion extends along a plane oriented perpendicular to a plane of deposition of the write head.

24. A method, comprising:
forming a slider or magnetic head having a first light channel and a second light channel, the first and second light channels having axes oriented at an angle relative to each other, the angle being less than 180 degrees; and
forming a hole in at least the magnetic head after formation thereof on the slider, the hole being adjacent an exit of the first light channel and an entrance to the second light channel, an index of refraction of the first light channel being different than air in the hole such that light from the first light channel is reflected into the second light channel.

25. A method as recited in claim 24, wherein the hole is formed by removal of a sacrificial material.

* * * * *